United States Patent
Oehler

[19]

[11] Patent Number: 5,899,643
[45] Date of Patent: May 4, 1999

[54] SLOT OPENING KEY FOR A CUTTING TOOL

[75] Inventor: Hermann Oehler, Freudental, Germany

[73] Assignee: Iscar Ltd., Midgal Tefen, Israel

[21] Appl. No.: 08/765,954

[22] PCT Filed: Jun. 9, 1995

[86] PCT No.: PCT/EP95/02228

§ 371 Date: Feb. 24, 1997

§ 102(e) Date: Feb. 24, 1997

[87] PCT Pub. No.: WO96/01714

PCT Pub. Date: Jan. 25, 1996

[30] Foreign Application Priority Data

Jul. 12, 1994 [DE] Germany ............................. 44 24 534

[51] Int. Cl.[6] ............................................. B23B 27/16
[52] U.S. Cl. ........................ 407/110; 407/107; 407/109; 82/160; 76/80
[58] Field of Search .................... 407/110, 109, 407/107, 40, 50; 82/160; 76/80

[56] References Cited

U.S. PATENT DOCUMENTS

| | | | |
|---|---|---|---|
| 361,142 | 4/1887 | Dalton | 76/80 X |
| 402,400 | 4/1889 | Cook | 76/80 |
| 3,175,426 | 3/1965 | Kolesh et al. | |
| 4,588,333 | 5/1986 | Gustafson. | |
| 5,035,545 | 7/1991 | Zinner. | |
| 5,697,271 | 12/1997 | Friedman et al. | 407/110 X |

FOREIGN PATENT DOCUMENTS

| | | | |
|---|---|---|---|
| 0 654 316 A1 | 5/1995 | European Pat. Off. . | |
| 58192 | 9/1969 | Poland | 407/110 |

*Primary Examiner*—Frances Han
*Assistant Examiner*—Henry W. H. Tsai
*Attorney, Agent, or Firm*—Pennie & Edmonds LLP

[57] ABSTRACT

A slot opening key having a body member provided with a first, planar abutment surface and a second surface recessed with respect to the first surface and co-directional therewith. The body member is provided with a pair of spaced-apart prongs which are substantially parallel to one another. The first prong protrudes from the first surface, and the second prong is positioned such that it is spaced apart from the first prong by at least a portion of the second surface. A prong rotating lever is provided to eccentrically rotate one prong relative to the other to adjust the spacing therebetween. The slot opening key is used to facilitate removal and insertion of a cutting insert retained between a resilient clamping jaw and a rigid base jaw, by inserting the prongs into corresponding apertures in each jaw, and actuating the rotating lever. The second surface between the first and second prongs provides clearance so that the key body remains clear of the insert during insertion and removal.

8 Claims, 3 Drawing Sheets

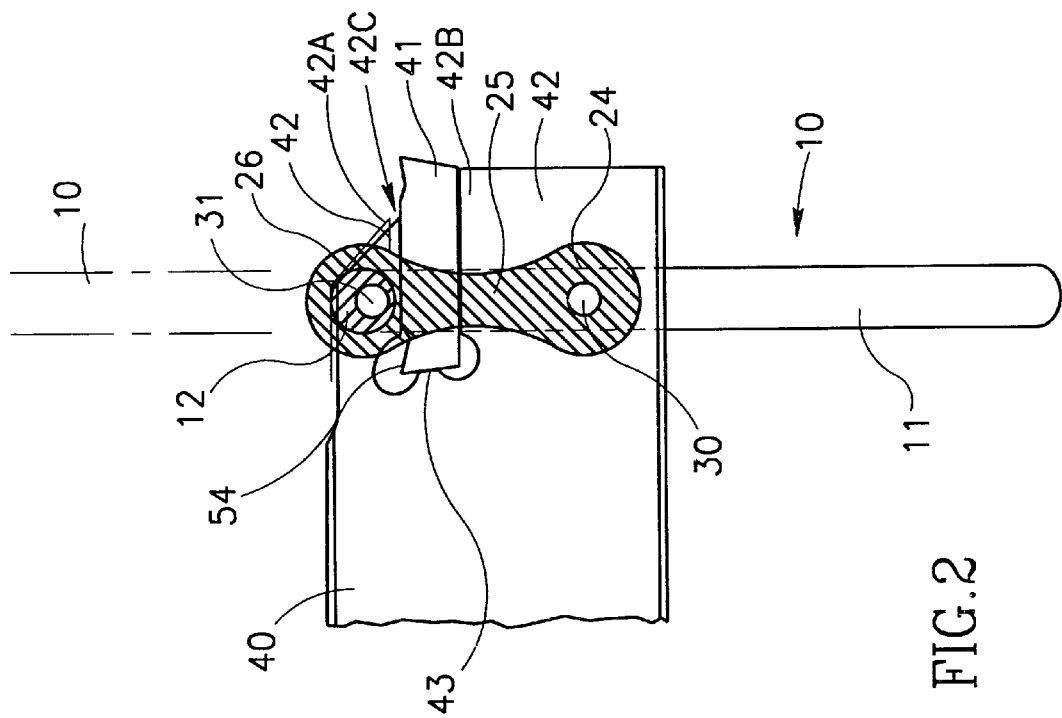
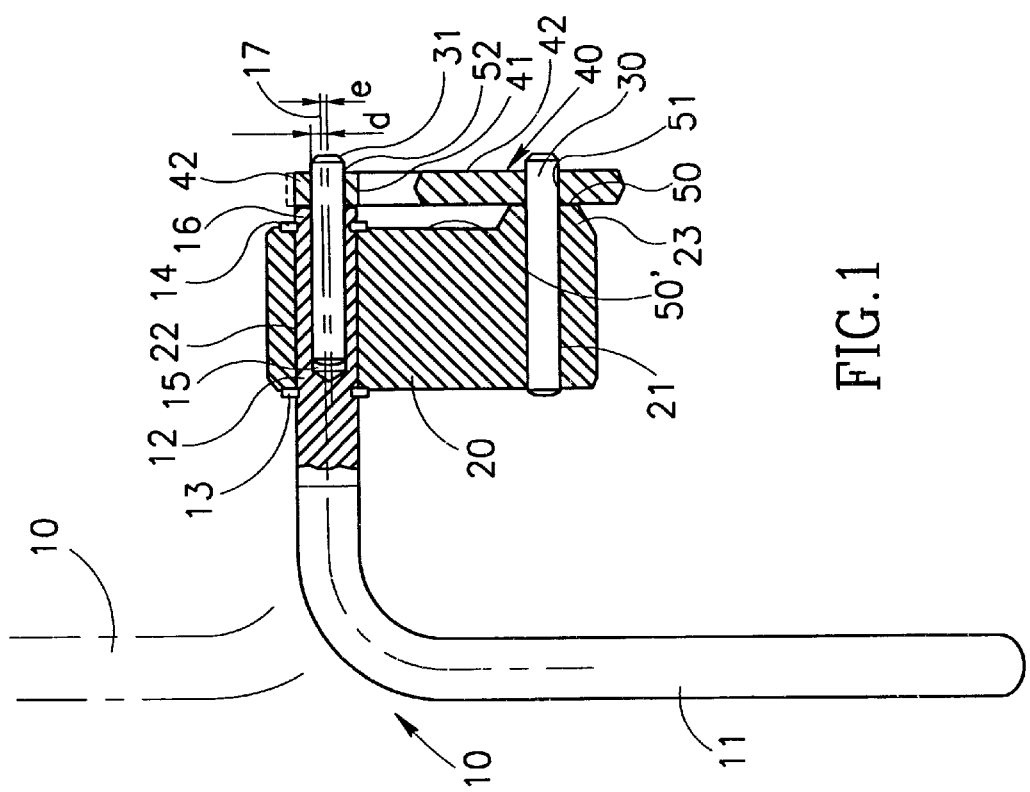

SLOT OPENING KEY FOR A CUTTING TOOL

BACKGROUND OF THE INVENTION

The invention relates to a tool for the replacement of a cutting insert which is gripped in a seat between two leg portions of a cutting insert holder.

Usually, such tools are designed as levers. When replacing the cutting insert, one lever end is propped by one of the two leg portions forming the seat for the cutting insert. The free lever end can then be manually adjusted, thereby creating a gap between the two leg portions and enabling the extraction of the cutting insert from the seat.

In such a case, it is not always possible to adjust the free lever end according to a predetermined length. There is a risk that the gap between the leg portions will be expanded to a non-permissible degree. This will plastically deform the leg portions, so that, after disengaging the lever, they will not return to their initial setting. As a result, the seat will be widened, preventing firm securing of the cutting insert and necessitating replacement of the cutting insert holder.

SUMMARY OF THE INVENTION

The object of the invention is to create a user-friendly tool which facilitates the replacement of a cutting insert without the risk of damaging the cutting insert holder.

According to the invention, this is accomplished in that a first supporting part is arranged on the basic body and is supported by a seat of the cutting insert holder, in that, at a distance from the first supporting part, a second supporting part is mounted, wherein this second part is mounted in another seat mounted within the range of a leg portion of the seat, or is propped by the cutting insert, and in that at least one of the two supporting parts is eccentrically adjustable around a rotation axis by means of an actuating element, so as to allow adjustment of the distance between the two supporting parts.

In such a design, the basic body can be mounted on the cutting insert holder so that the first supporting part is supported by the associated seat. In this position of the basic body, the second supporting part can be mounted, for example, in a seat arranged on one of the two leg portions. Both supporting parts can be moved, relatively to each other, by means of the actuating element and the eccentric arrangement of at least one of the supporting parts. Thereby the two leg portions will be spread, so that the clamping, by which the cutting insert is retained, is eliminated. However, the two leg portions can only be mutually adjusted along a predetermined fixed distance. Said distance is determined by the dimension of the eccentricity. This safety prevents plastic deformation of the leg portions. According to the invention, it is, however, also possible for the second supporting part to be supported by the cutting insert. For example, a special seat can be provided for this purpose on the cutting insert. At the same time, it is also possible to support the second supporting part by means of a body surface of the cutting insert.

In the above cases, the cutting insert can be forcefully moved in the seat by rotation of the eccentrically mounted support part. According to the design of the seat for the second support part, the cutting insert can either be extracted from, or inserted into, the seat of the cutting insert holder.

However, it is also possible to design the seat of the second support part in such a way that the cutting insert can be extracted from, as well as inserted into, the seat of the cutting insert holder.

In one preferred embodiment of the invention, the basic body has a bore in which a bolt rests, which can be rotated around its axis, and the support part is mounted on the front end of the bolt, eccentrically to the rotation axis. Within the bore, the bolt forms a pivot bearing, which can be produced with little effort. In order to provide bolt rotation, it is, for example, possible to connect to the bolt a grip with a handle that acts as an actuating element. When adjusting the handle, the bolt rotates in the pivot bearing. Due to this adjustment, the support part, which is mounted eccentrically to the rotation axis, will be moved in a circle around the rotation axis, thus changing the distance towards the second support part. This relative movement of the support parts toward each other facilitates the replacement of the cutting insert.

In another preferred embodiment of the invention, the first support part is designed as a cylindrical pin, whose one end rests in bore in the basic body, and whose other end, which is opposite to the basic body, can be inserted in a bore of the cutting insert holder.

A better handling of the tool can be achieved if the basic body is held by means of one or several projections at a certain distance from the cutting insert holder.

An ergonomically designed gripping shape of the basic body is achieved by the fact that the basic body has two end sections and one middle section connecting the end sections, that the end sections carry the support parts and that the cross-section of the middle section is narrower than the end sections.

According to one preferred variant embodiment of the tool, the two seats of the support parts are mounted on each leg portion of the seat of the cutting insert; due to the mutual adjustment of both support parts, the leg portions are spread, and thereby the seat is elastically expanded. In the expanded state of the seat, the cutting insert can be easily inserted or extracted.

However, it is also possible for the second support part to be supported by one body edge or by an opening or a depression in the cutting insert. In this way, it is possible to exert force by means of the support part directly onto the cutting insert, thereby facilitating extraction/insertion of the cutting insert from/into the seat.

The invention is described in detail by means of the embodiments shown in the drawings as follows:

BRIEF DESCRIPTION OF THE DRAWINGS

FIG. 1: front view and cross section of a chisel holder with a laterally mounted tool for replacement of a cutting insert;

FIG. 2: the diagram according to FIG. 1 in side view;

DETAILED DESCRIPTION OF THE INVENTION

Figure 4:
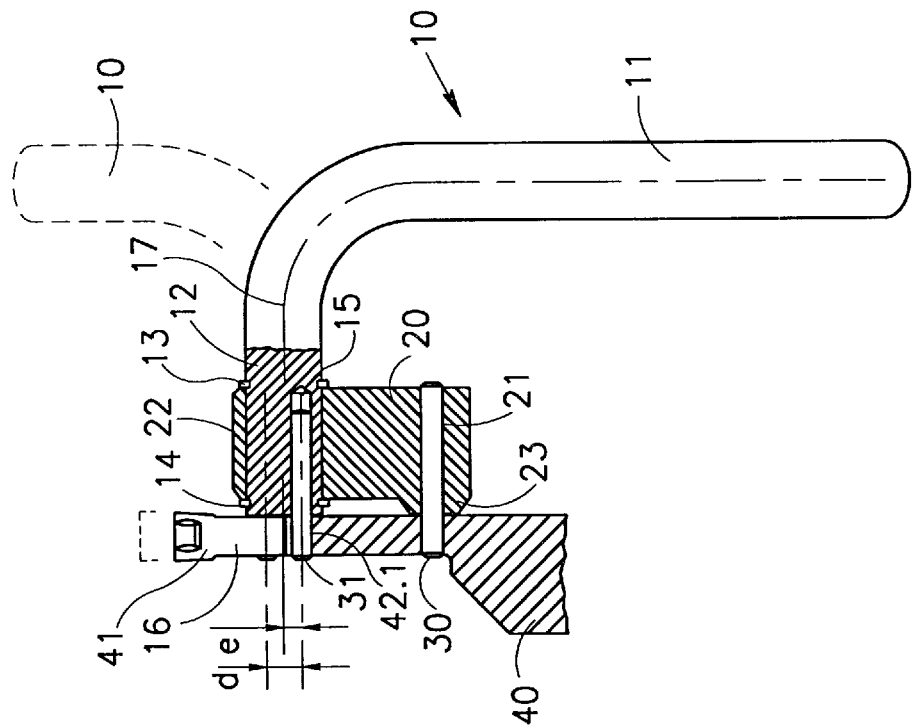
FIG. 4: diagram according to FIG. 3 in a top view and partial cross-section.

FIG. 1 shows the front view of a holder blade 40 in which a cutting insert 41 is fixed in a seat. Such cutting insert holders are used with a lathe as parting tools. The cutting insert 41 is held in the seat clamped by two leg portions 42 of the cutting insert holder 40. As FIG. 2 shows in greater detail, the two leg portions 42 comprise parallel bearing surfaces, which are pressed onto the cutting insert 41. The parallel bearing surfaces are formed on an upper clamping jaw 42a and a lower base jaw 42b which define therebetween an insert receiving slot 42c, or seat. If, after machining a workpiece, the cutting insert 41 is worn out, it must be replaced. For this purpose, the tool shown in FIG. 1 is used, and may be mounted laterally on the cutting insert holder 40. The tool has a basic body 20, in which two parallel bores 21, 22 are made.

One support part 30, designed as a pin, or prong, is inserted into the bore 21. The external diameter of the first support part 30 has been chosen slightly larger than the diameter of the bore 21 so that the first support part 30 is clamped in the bore 21. A bolt 12 is inserted in the bore 22, which is parallel to the bore 21. The bore 22 and the bolt 12 provide a pivot bearing. In order to prevent the extraction of bolt 12 from the bore 22, safety rings 13, 14 are be fixed on the bolt 12 at each of the bore outlets. One actuating element 10 is integrally connected to the bolt 12. Part of the actuating element 10 extends in the direction of the axis of the bore 22 and is then bent 90° to form a handle 11. The middle axis of the bore 22 provides a rotation axis 17 around which the bolt 12 can rotate. The front end of the bolt 12, which is directed opposite to the handle 11 has a blind or pocket hole 15. The drill axis of the pocket hole 15 is located parallel and at a distance 'e' from the rotation axis 17. A second support element 31 is inserted into the pocket hole 15.

The support part 31, designed as a pin, is mounted eccentrically with respect to the rotation axis 17 at the distance e. Around the outlet opening of the bore 21, which is directed towards the cutting insert holder 40, a projection 23 having a planar first abutment surface 50 is provided, which, together with a protrusion 16 of the bolt 12, serving as a planar second abutment surface, keeps the basic body 20 at a distance from the cutting insert holder 40. The bolt 12 protrudes from a second surface 50' which is recessed with respect to the abutment surface 50 and extends between the bolt 12 and the projection 23. This prevents the basic body 20 from touching the cutting insert 41, which protrudes sideways from the cutting insert holder 40. Thus, as seen FIG. 1, the second surface 50' is sufficiently recessed from the insert that the complete width of the insert 41, including its trailing portion 54, is visible in a front view of the holder blade. In addition a better handling of the basic body is thereby achieved.

The two supporting parts 30, 31 are inserted into support aperture 51 and displacement aperture 52, respectively, of the cutting insert holder 40. Each of the apertures designed as bores are provided in the leg portions 42. To spread the two leg portions 42, thereby expanding the seat which holds the cutting insert 41, the lever 11 of the actuating element 10 is brought into the position shown in the drawing by dashed lines. Thereby the second support part 31 pivots around the rotation axis 17. In the final position of the lever 11, the second support part has moved twice as much as eccentricity e, as marked in FIG. 1 by 'd'. Thereby, as shown in FIG. 2 by the dashed line, the upper leg portion 42 is moved by 'd' from the cutting insert 41.

The clamping force which keeps the cutting plate 41 in place is thereby suspended, so that the cutting insert 41 can be removed from the cutting insert holder 40. As may be also seen from FIG. 2, in this case the cutting insert 41 is designed as a removable insert; when worn out, this insert may be rotated by 180° and re-inserted into the seat of the cutting insert holder 40. On its back, the seat provides a stopper device 43 by which the cutting insert 41 is definitely stopped. When the lever 11 is returned to its original position, the upper leg portion 42 slips onto the cutting insert 41, so that it will again be fixed by clamping. The tool can then be extracted from the cutting insert holder 40, whereby the support part 30, 31 are disengaged from the bores of the cutting insert holder 40.

The basic body 20 consists of three part: two lateral portions 24, 26, connected by a central portion 25. The central portion 25 is narrower than the lateral portions 24, 26, facilitating favourable ergonomic gripping and handling of the basic body 20. For handling, the handle 11 can be enclosed by the hand and the middle part of the basic body 20 can be held between the thumb and the index finger.

Figure 3:
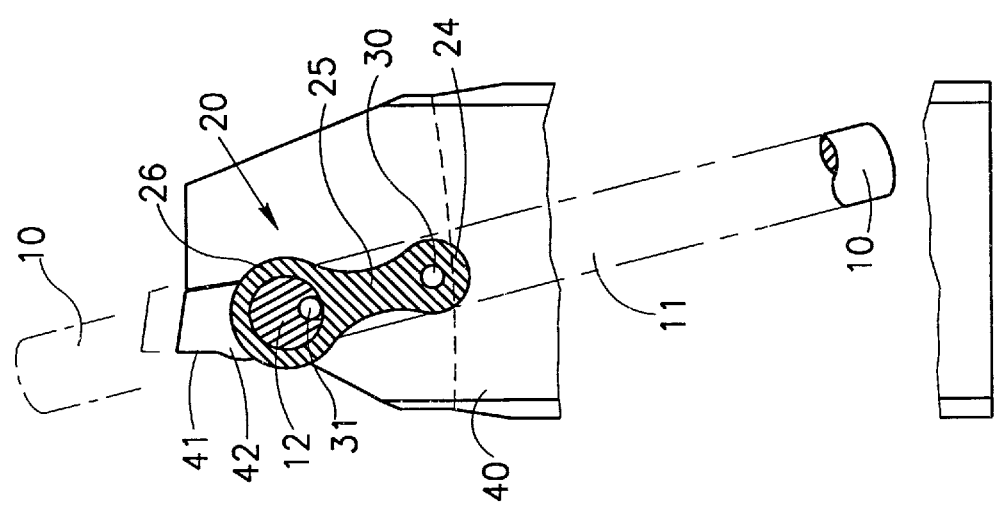
FIG. 3: side view of a chisel holder with a laterally mounted tool for the extraction of a cutting insert fixed in the seat of the cutting insert holder.

An additional variant embodiment of a tool for the replacement of a cutting insert 41 is shown in FIGS. 3 and 4. The cutting insert 41, which is clamped in the cutting insert holder 40 between two leg portions 42, may be extracted by the tool from the seat. For this purpose the seat is made wider at its back by means of an opening 42.1. The first support part 30 is inserted into a passage bore provided in the cutting insert holder 40, and the second support part 31 into the opening 42.1. The tool, in principle, is of similar design to the tool shown in FIGS. 1 and 2. However, the bolt 12 has a larger diameter, and, furthermore, a greater setting range d is provided by means of the eccentricity e by which the second support part 31 is mounted offset with respect to the rotation axis 17. Due to a movement of the bolt 12 in the bore 22, the second support part 31 is moved into the position marked by the dashed lines. Since the second support part 31 leans backwards onto a body surface of the cutting insert 41, the cutting insert 41 will also move in the seat by a distance d. Distance d is big enough to enable full extraction of the cutting insert 41 from the seat, or at least to move it to such a degree that it can be extracted by hand with the application of relatively little force.

A bore, depression, etc. can also be made in the cutting insert 41, in which the second support part 31 is supported. This enables extraction as well as reinsertion of the cutting insert 41 from and into the seat of the cutting insert holder 40, respectively. A worn-out cutting insert 41 can then be extracted from and a new one reinserted into the seat by means of the tool.

Figure 5:
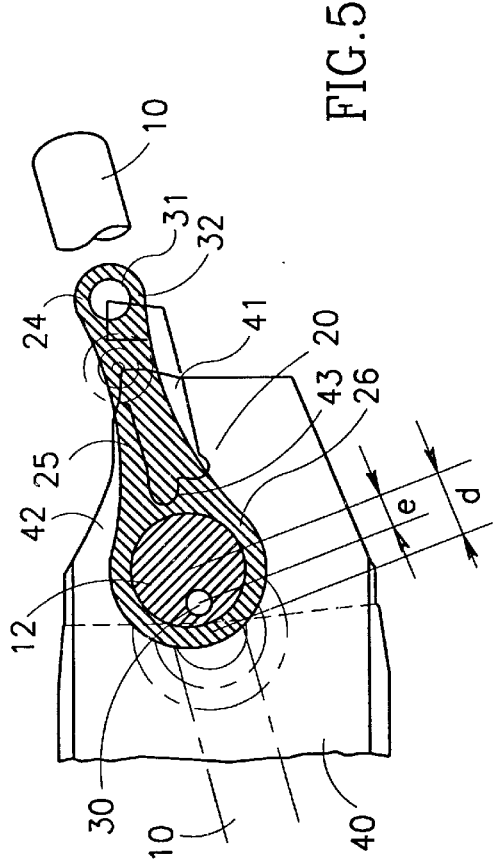
FIG. 5: side view of a cutting insert holder and a tool mounted on it for the insertion of a cutting insert into the seat of the cutting insert holder.
Figure 6:
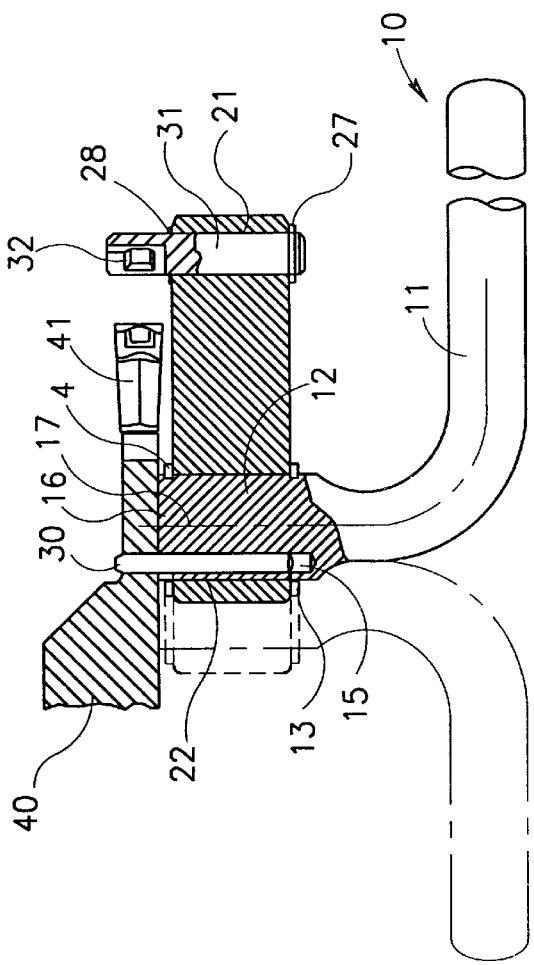
FIG. 6: the diagram according to FIG. 5 in a top view and partial cross-section.

The tool shown in FIGS. 5 and 6 facilitates the insertion of a cutting insert 41 into the seat of the cutting insert holder 40. As can be seen from this drawing, the first support part 30 is inserted into a bolt 12 to which the actuating device 10 is connected. The second support part 31 has a seat 32 which accepts the cutting edge of the cutting insert 41. When changing the position of the actuating element 10 to a position marked by the dashed lines, the distance between the first and the second support part 30, 31 will be diminished by the distance d, enabling insertion of the cutting insert 41 into the seat of the cutting insert holder 40.

In the above-mentioned case, both the first and the second support parts 30, 31 are connected to the basic body 20 by means of a pivot bearing. In order to prevent its extraction from the bore 21, the second support part 31 is secured by two securing rings 27, 28. When rotating the actuating element 10, the basic body 20 will be offset parallel to the image plane according to FIG. 5. Due to the pivot bearing of the second support part 31, this part also pivots. This has the result of keeping the cutting edge of the cutting insert 41 free, except for the forces acting in the direction of the desired movement. This will prevent damaging the cutting edge.

I claim:

1. A slot opening key for use in a metal cutting tool assembly, the assembly comprising a rigid holder blade with a rigid base jaw and a resiliently displaceable clamping jaw defining an insert receiving slot for receiving a cutting insert with a trailing portion protruding sideways relative to the holder blade in a front view thereof, spaced apart supporting and displacement apertures respectively formed in said base and clamping jaws, said slot opening key comprising:

a body member having a pair of spaced apart, substantially planar abutment surfaces laterally disposed with respect to a second surface substantially co-directional with said abutment surfaces and recessed relative thereto;

a pair of spaced apart, substantially parallel prongs provided to said body member, each prong protruding from a respective one of said abutment surfaces; and an actuating element having an axis of rotation for eccentrically rotating one of said prongs about said axis of rotation;

the arrangement being such that on full insertion of said pair of prongs into said supporting and displacement apertures, said abutment surfaces abut against said base and clamping jaws whereupon said second surface is sufficiently recessed from a side surface of the cutting insert such that the trailing portion of the cutting insert is visible in the front view of the holder blade.

2. The slot opening key according to claim 1 wherein said body member has a central portion between first and second lateral portions, each of said lateral portions being associated with one of said pair of prongs, said central portion having a reduced thickness relative to said lateral portions in a side view of the holder blade.

3. The slot opening key according to claim 1, wherein said actuating element actuates a first prong of said pair of prongs associated with a first abutment surface of said pair of abutment surfaces having a smaller abutment area than the second abutment surface of said pair of abutment surfaces associated with a second prong of said pair of prongs.

4. The slot opening key according to claim 1, wherein the key body is provided with a bore and a first prong of said pair of prongs is mounted in said bore, said actuating element having a first portion extending in a direction of an axis of said bore, and a handle portion connected to said first portion and being oriented at substantially a 90° angle thereto.

5. A metal cutting tool assembly comprising:

a rigid holder blade with a rigid base jaw and a resiliently displaceable clamping jaw defining an insert receiving slot, spaced apart supporting and displacement apertures respectively formed in said base and clamping jaws, a cutting insert held within said insert receiving slot, said cutting insert having a trailing portion protruding sideways relative to the holder blade in a front view thereof; and a slot opening key comprising:

a body member having a pair of spaced apart, substantially planar abutment surfaces laterally disposed with respect to a second surface substantially co-directional with said abutment surfaces and recessed relative thereto;

a pair of spaced apart, substantially parallel prongs provided to said body member, each prong protruding from a respective one of said abutment surfaces; and an actuating element having an axis of rotation for eccentrically rotating one of said prongs about said axis of rotation, wherein upon full insertion of said pair of prongs into said supporting and displacement apertures, said abutment surfaces abut against said base and clamping jaws and said second surface is sufficiently recessed from a side surface of the cutting insert such that the trailing portion of the cutting insert is visible in the front view of the holder blade.

6. The metal cutting tool assembly according to claim 5, wherein said body member has a central portion between first and second lateral portions, each of said lateral portions being associated with one of said pair of prongs, said central portion having a reduced thickness relative to said lateral portions in a side view of the holder blade.

7. The metal cutting tool assembly according to claim 5, wherein said actuating element actuates a first prong of said pair of prongs associated with a first abutment surface of said pair of abutment surfaces having a smaller abutment area than the second abutment surface of said pair of abutment surfaces associated with a second prong of said pair of prongs.

8. The metal cutting tool assembly according to claim 5, wherein the key body is provided with a bore and a first prong of said pair of prongs is mounted in said bore, said actuating element having a first portion extending in a direction of an axis of said bore, and a handle portion connected to said first portion and being oriented at substantially a 90° angle thereto.

* * * * *